(12) United States Patent
Barger et al.

(10) Patent No.: US 8,437,223 B2
(45) Date of Patent: May 7, 2013

(54) SYSTEM AND METHODS FOR DETECTING SHOOTER LOCATIONS FROM AN AIRCRAFT

(75) Inventors: James E. Barger, Winchester, MA (US); Scott E. Ritter, Sudbury, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 532 days.

(21) Appl. No.: 12/220,745

(22) Filed: Jul. 28, 2008

(65) Prior Publication Data

US 2010/0020643 A1    Jan. 28, 2010

(51) Int. Cl.
*G01S 3/802*    (2006.01)

(52) U.S. Cl.
USPC .......................................... 367/129; 367/906

(58) Field of Classification Search .................. 367/127, 367/129, 906
See application file for complete search history.

(56) References Cited

U.S. PATENT DOCUMENTS

| | | |
|---|---|---|
| 2,435,231 A | 2/1948 | McPherson |
| 2,962,696 A | 11/1960 | Snyder |
| 4,283,989 A | 8/1981 | Toulios et al. |
| 4,813,877 A | 3/1989 | Sanctuary et al. |
| 4,827,411 A | 5/1989 | Arrowood et al. |
| 4,970,698 A | 11/1990 | Dumestre, III |
| 5,093,824 A | 3/1992 | Coan et al. |
| 5,241,518 A | 8/1993 | McNelis et al. |
| 5,243,592 A | 9/1993 | Perlman et al. |
| 5,280,457 A | 1/1994 | Figueroa et al. |
| 5,346,210 A | 9/1994 | Utke et al. |
| 5,392,258 A | 2/1995 | Gabrielson et al. |
| 5,544,129 A | 8/1996 | McNelis |
| 5,586,086 A * | 12/1996 | Permuy et al. ................ 367/127 |
| 5,617,371 A | 4/1997 | Williams |
| 5,703,321 A | 12/1997 | Feierlein et al. |
| 5,742,820 A | 4/1998 | Perlman et al. |
| 5,777,948 A | 7/1998 | Ferkinhoff et al. |

(Continued)

FOREIGN PATENT DOCUMENTS

| | | |
|---|---|---|
| EP | 0447725 | 9/1991 |
| EP | 0610129 A1 | 8/1994 |

(Continued)

OTHER PUBLICATIONS

Mays, Brian T., "Shockwave and Muzzle Blast Classification via Joint Time Frequency and Wavelet Analysis", US Army Research Laboratory, Adelphi, MD, Sep. 30, 2001.

(Continued)

*Primary Examiner* — Ian Lobo
(74) *Attorney, Agent, or Firm* — Lando & Anastasi, LLP

(57) ABSTRACT

The systems and methods described herein relate to an airborne shooter detection system having a plurality of sensors coupled to the body of an aircraft such as a helicopter. The system includes at least five sensors configured and arranged to disambiguate the location of a shooter. By measuring the arrival times of the shockwaves of projectiles at each of the sensors and determining the differences in the arrival times among sensors, the systems and methods may determine the location of one or more sources of the projectiles. A distance of at least ten meters separates two or more of the sensors. Such a separation is advantageous because it allows the system to disambiguate multiple shooters by resolving the curvature of the shockwave.

20 Claims, 8 Drawing Sheets

U.S. PATENT DOCUMENTS

| | | | |
|---|---|---|---|
| 5,781,505 A | 7/1998 | Rowland |
| 5,850,592 A | 12/1998 | Ramanathan |
| 5,878,000 A | 3/1999 | Dubois |
| 5,878,095 A | 3/1999 | Kainulainen |
| 5,881,246 A | 3/1999 | Crawley et al. |
| 5,912,862 A | 6/1999 | Gustavsen et al. |
| 5,913,921 A | 6/1999 | Tosey et al. |
| 5,920,522 A | 7/1999 | Levanon et al. |
| 5,930,202 A | 7/1999 | Duckworth et al. |
| 5,970,024 A | 10/1999 | Smith |
| 5,973,998 A | 10/1999 | Showen et al. |
| 6,041,654 A | 3/2000 | Stake |
| 6,055,523 A | 4/2000 | Hillis |
| 6,088,622 A | 7/2000 | Dollin et al. |
| 6,178,141 B1 | 1/2001 | Duckworth et al. |
| 6,198,694 B1 | 3/2001 | Kroling et al. |
| 6,223,458 B1 | 5/2001 | Schwinkendorf et al. |
| 6,349,091 B1 | 2/2002 | Li |
| 6,370,084 B1 | 4/2002 | Cray |
| 6,385,714 B1 | 5/2002 | Li |
| 6,418,299 B1 | 7/2002 | Ramanathan |
| 6,470,329 B1 | 10/2002 | Livschitz |
| 6,487,516 B1 | 11/2002 | Amorai-Moriya et al. |
| 6,487,587 B1 | 11/2002 | Dubey |
| 6,563,763 B2 | 5/2003 | McNelism |
| 6,621,764 B1 | 9/2003 | Smith |
| 6,745,224 B1 | 6/2004 | D'Souza et al. |
| 6,847,587 B2 | 1/2005 | Patterson et al. |
| 6,965,312 B2 | 11/2005 | Lerg |
| 6,965,541 B2 | 11/2005 | Lapin et al. |
| 6,977,937 B1 | 12/2005 | Weinstein et al. |
| 7,054,228 B1 | 5/2006 | Hickling |
| 7,126,877 B2 | 10/2006 | Barger et al. |
| 7,139,222 B1 | 11/2006 | Baxter et al. |
| 7,162,043 B2 | 1/2007 | Sugiyama et al. |
| 7,190,633 B2 | 3/2007 | Brinn et al. |
| 7,203,132 B2 | 4/2007 | Berger |
| 7,266,045 B2 | 9/2007 | Baxter et al. |
| 7,292,501 B2 | 11/2007 | Barger |
| 7,362,654 B2 | 4/2008 | Bitton |
| 7,372,772 B2 | 5/2008 | Brinn et al. |
| 7,372,773 B2 | 5/2008 | Horak |
| 7,372,774 B1 | 5/2008 | Uzes |
| 7,408,840 B2 | 8/2008 | Barger et al. |
| 7,411,865 B2 | 8/2008 | Calhoun |
| 7,420,878 B2 | 9/2008 | Holmes et al. |
| 7,433,266 B2 | 10/2008 | Ledeczi et al. |
| 7,474,589 B2 | 1/2009 | Showen et al. |
| 7,495,998 B1 | 2/2009 | Deligeorges et al. |
| 7,502,279 B2 | 3/2009 | Wignall et al. |
| 7,532,542 B2 | 5/2009 | Baxter et al. |
| 2002/0003470 A1 | 1/2002 | Auerbach |
| 2002/0029214 A1 | 3/2002 | Yianilos et al. |
| 2004/0100868 A1 | 5/2004 | Patterson, Jr. et al. |
| 2004/0246902 A1 | 12/2004 | Weinstein et al. |
| 2005/0194201 A1 | 9/2005 | Tenghamn et al. |
| 2005/0237186 A1 | 10/2005 | Fisher et al. |
| 2006/0044941 A1 | 3/2006 | Barger et al. |
| 2006/0044942 A1 | 3/2006 | Brinn et al. |
| 2006/0044943 A1 | 3/2006 | Barger et al. |
| 2006/0256660 A1 | 11/2006 | Berger |
| 2007/0030763 A1 | 2/2007 | Barger et al. |
| 2007/0171769 A1 | 7/2007 | Brinn et al. |
| 2007/0230269 A1 | 10/2007 | Ledeczi et al. |
| 2007/0237030 A1 | 10/2007 | Barger et al. |
| 2008/0008044 A1 | 1/2008 | Patterson et al. |
| 2008/0084473 A1 | 4/2008 | Romanowich |
| 2008/0105111 A1* | 5/2008 | Costanza et al. ............... 89/1.11 |
| 2008/0159078 A1 | 7/2008 | Barger et al. |
| 2008/0162089 A1 | 7/2008 | Barger et al. |
| 2008/0298176 A1 | 12/2008 | Fisher et al. |
| 2009/0086577 A1 | 4/2009 | Ledeczi et al. |
| 2009/0174589 A1* | 7/2009 | Moraites ..................... 342/14 |

FOREIGN PATENT DOCUMENTS

| | | |
|---|---|---|
| GB | 2 015 127 A | 9/1979 |
| GB | 2181239 | 4/1987 |
| GB | 2181240 | 4/1987 |
| KR | 20020076005 A | 10/2002 |
| WO | WO-0137483 A | 5/2001 |
| WO | WO-02/082097 A2 | 10/2002 |
| WO | WO-2006096208 A2 | 9/2006 |
| WO | WO-2009046367 | 4/2009 |
| WO | WO-2009053702 | 4/2009 |

OTHER PUBLICATIONS

U.S. Appl. No. 11/904,452, Brinn et al.
"Countersniper System", ISIS, 2008; Vanderbilt University/School of Engineering, retrieved from http://www.isis.vanderbilt.edu/projects/countersniper on Aug. 6, 2009.
Aceves et al., "Analysis of Routing Strategies for Packet Radio Networks," Proc. of the IEEE INFOCOM '85, Washington, DC, 292-302 (185).
Balogh, et al, "Wireless Sensor Network-Based Projectile Trajectory Estimation", Insitute for Software Integrated Systems, Vanderbilt University (2008).
Boggs, Jeffrey A., "Geolocation of an Audio Source in a Multipath Environment Using Time-of-Arrival" Air Force Institute of Technology, Graduate School of Engineering and Management Mar. 2003-Mar. 2004.
Chadha, Ankit, "Development of a new technology for sound source localisation", Thesis submitted to the Faculty of the Graduate School of Wayne State University, Detroit, Michigan (2007).
Chu, et al, "Semantic context detection using audio event fusion: Camera-ready version", EURASIP Journal on Applied Signal Processing, vol. 2006, Article ID 27390, pp. 1-12.
Chu, et al, "Toward semantic indexing and retrieval using hierarchical audio models", Multimedia Systems (2005) 10(6): 570-583; Received: Apr. 16, 2004 / Revised: Nov. 20, 2004 / Published online: May 10, 2005.
Collings, S.W., "Acoustic Beamforming on Wireless Sensor Nodes", Thesis submitted to the Faculty of the Graduate School of Vanderbilt University, May 2008.
Danicki, E., "The shock wave-based acoustic sniper localization," Nonlinear Analysis, Elsevier, 65 (2006), pp. 956-962.
European Search Report in European Application No. EP08004009 dated Mar. 12, 2009.
Final Office Action, U.S. Appl. No. 12/075,051, mailed Feb. 10, 2009.
Hahn et al "Packet Radio Network Routing Algorithms: A Survey," IEEE Communications Magazine, 22:11, 41-7 (Nov. 1984).
Jubin et al., "The DARPA Packet Radio Network Protocols," Proc. of the IEEE, 75:1, 21-32 (Jan. 1987).
Julier, et al, "BARS: Battlefield Augmented Reality System", Advanced Information Technology, Naval Research Laboratory (2007).
Kahn, "The Organization of Computer Resources into a Packet Radio Network," IEEE Trans. on Communications. COM-25:1, 169-78 (Jan. 1977).
Kalyanmoy Deb, Mult-Objective Optimization Using Evolutionary Algorithms, John Wiley & Sons, Ltd., pp. 85-101 (2001).
Karsai et al, "A Model-based Front-end to TAO/ACE: The Embedded System Modeling Language" Institute for Software-Integrated Systems, Vandebilt University (2008).
Kushwaha, et al, "Sensor Node Localization Using Mobile Acoustic Beacons". Institute for Software Integrated Systems, Vanderbilt University (2005).
Kusy, et al, "Elapsed time on arrival: a simple and versatile primitive for canonical time synchronisation services", Int. J. Ad Hoc and Ubiquitous Computer, vol. x, No. x, 200x (2006).
Lauer, "Packet Radio Routing," Ch. 11, "Routing in Communications Networks," ed. Martha Steenstrup, Prentice Hall, pp. 352-396 (1995).
Ledeczi et al, "Multiple Simultaneous Acoustic Source Localization in Urban Terrain." Institute for Software Inegrated Systems, pp. 491-496, ISBN#0-7803-9201-9 (2005).
Livingston, et al, "An augmented reality system for military operations in urban terrain", Proceedings of the Interservice/Industry Training, Simulation & Education Conference (I/ITSEC '02), Dec. 2-5, 2002.

Marano, et al, "Support-based and ML approaches to DOA estimation in a dumb sensor network", IEE Transactions on Signal Processing, vol. 54, No. 4, Apr. 2006.

Maroti et al, "Shooter Localization in Urban Terrain," Computer, 37:8, Aug. 2004, pp. 60-61.

Martinez, et al, "Sensor network applications", IEE Computer Society, vol. 37, No. 8, Aug. 2004.

Molnar et al, "Muzzle Blast Detection Via Short Time Fourier Transform", Feb. 2005, Vanderbilt University, pp. 1-2.

Moy, John, "Link-State Routing,", Ch. 5, "Routing in Communications Networks," ed. Martha Steenstrup, Prentice Hall, pp. 136-157 (1995).

Pecina, J.N., "Unmanned Navigation with a Novel Laser and a Smart Software," Aerospace Conference, 2003. Proceedings. 2003 IEEE, vol. 1, Mar 8-15, 2003 pp. 305-312.

Pierce, Allen D., "Nonlinear Effects in Sound Propagation", Acoustics, McGraw-Hill Book Company, pp. 611-614 (1981).

Salisbury, David F, "Network turns soldiers' helmets into sniper location system", Phys.Org.com, retreived from http://www.physorg.com/news157123967.html on Aug. 7, 2009.

Stephen, Tan Kok Sin, "Source Localization Using Wireless Sensor Networks", Naval Postgraduate School, Jun. 2006.

Stoughton, R.B., "SAIC Sentinel Acoustic Counter-Sniper System," Proceedings of SPIE, vol. 2938, Nov. 19, 1996, pp. 276-284, XP00251780, Section 3.

U.S. Appl. No. 09/546,052, filed Apr. 10, 2000; Joseph Jacob Weinstein et al.; Radio Network Routing Apparatus; 31 pages. Under examination by Toan D. Nguyen.

U.S. Appl. No. 10/752,988, filed Jan. 7, 2004; Joseph Jacob Weinstein et al; Systems and Methods for Constructing a Virtual Model of a Multi-Hop, Multi-Access Network.

U.S. Appl. No. 10/797,030, filed Mar. 11, 2004; Joseph Jacob Weinstein et al.; Systems and Methods for synchronizing Multiple Copies of a Database Using Database Digest.

Volgyesi, et all, "Shooter localization and weapon classification with soldier-wearable networked sensors", Institute for Software Integrated Systems, Vanderbilt University (2008).

International Search Report and Written Opinion for International Application No. PCT/US2009/050814 mailed Jun. 9, 2011.

US 5,168,475, 12/1992, McNelis et al. (withdrawn)

* cited by examiner

SYSTEM AND METHODS FOR DETECTING SHOOTER LOCATIONS FROM AN AIRCRAFT

FIELD OF THE INVENTION

This invention relates generally to airborne security systems, and more particularly to systems and methods for detecting the origin and path of supersonic projectiles fired at aircraft.

BACKGROUND

With recent developments in weapons technology combined with an evolving face of global terrorism, there has been an increase in the threat posed to aircraft in combat, rescue and humanitarian missions. In particular, terrorist militiamen are using inexpensive, portable and readily available weapons such as sniper rifles and shoulder-fired missiles against low flying aircraft such as helicopters, and airplanes during landing and takeoff. Many military aircraft have systems on board to identify approaching surface-to-air or air-to-air missiles and can defend themselves by deploying appropriate countermeasures.

However, sniper rifles pose larger problems to civilian aircraft as well as conventional on-board defense systems on military aircraft. These weapons tend to be lightweight and require little or no training to operate. Moreover, the bullets from these weapons are much smaller than conventional missiles. Consequently, they are difficult to detect using conventional on-board missile defense systems. Additionally, these weapons are difficult to counter because they are portable. There could be any number of armed individuals moving from one place to another firing at overhead aircraft. Therefore, target aircraft would need to not only deploy counter measures, but also identify and neutralize the source of the gunfire.

Many current-day systems for determining the location of a shooter include sensors that record acoustic signals generated by the muzzle blast of the firing weapon or by both muzzle blast as well the shockwave of the projectile. Typically requiring the signals from the muzzle blast, these systems identify the source of the projectile, the fuselage of an aircraft, however, is generally very noisy and, more importantly, noisy at muzzle-blast frequencies. Therefore, these systems are not effective in an aircraft environment, especially on the body of a plane or helicopter.

There are also systems that detect shooter locations using only acoustic signals from the shockwave of the projectile. Such systems typically include an array of closely spaced sensors. These systems are designed for ground applications, where surface gunfire typically comes from sources that are near their targets and missing projectiles fly close to the target. However, when implemented in aircraft these systems have relatively low accuracy because the aircraft are much further away from the source of gunfire and missing projectiles may fly far away from the aircraft.

Accordingly, there is a need for an airborne shooter detection system capable of locating a position of a shooter.

SUMMARY OF THE INVENTION

The systems and methods described herein include improved systems and methods for detecting, from an aircraft, the source of projectiles such as bullets. As noted earlier, many modern day shooter detection systems that use signals from projectile shockwaves cannot easily be utilized on an aircraft. These detection systems have one or more acoustic sensors placed relatively close to each other and are mounted together on a compact unitary body. Such a system is particularly disadvantageous for use on an aircraft because closely spaced sensors are inaccurate in determining the source of projectiles when the acoustic signature of the projectile could be attributed to two potential shooter locations. The systems and methods described herein, overcome these deficiencies. The systems include sensors positioned on the aircraft so that at least five (5), and preferably six (6) or seven (7) of the sensors detect shockwaves from projectiles having potentially ambiguous trajectories, even if the aircraft banks and changes orientation. By measuring the arrival times of the shockwave of a projectiles at each of the sensors and determining the difference in the arrival times between sensors, the systems and methods may determine the location of one or more sources of the projectile. Depending on a desired level of predictive confidence, a distance of at least ten (10) meters separates two or more of the sensors. Such a separation is advantageous because it allows the system to disambiguate potential shooter locations by resolving the curvature of the shockwave.

More particularly, in one aspect, the systems and methods described herein include airborne shooter detection systems for an aircraft. The systems may include a plurality of sensors, a processor in communication with a plurality of sensors configured for unambiguously determining the location of the source of the projectile and an output device in communication with the processor for outputting the determined location. The plurality of sensors may be spaced apart on the surface of the body of an aircraft configured for receiving signals indicative of one or more characteristics of a shockwave of a projectile. The output device may include at least one of a display, heads-up display (HUD), helmet display, intercom, radio and headset.

In certain embodiments, the plurality of sensors includes at least five sensors. The plurality of sensors may include about seven sensors. In some embodiments, the plurality of sensors includes from about 15 to about 18 sensors. At least two sensors may be separated by a distance sufficient to unambiguously determine the location of the source of the projectile with a probability of greater than about 0.8. The at least two sensors may be separated by a distance from about 8 m to about 11 m. In certain embodiments, at least two sensors are separated by a distance of about 10 m.

In certain embodiments, the systems may include an aircraft avionics system in communication with the processor. At least one of a temperature sensor and pressure sensor may be coupled to the aircraft avionics system. The processor may be configured to receive data from the at least one temperature sensor and pressure sensor via the aircraft avionics system for unambiguously determining the location of the source of the projectile. In certain embodiments, the processor includes a shooter location application for determining the location of the source of the projectile.

In another aspect, the systems and methods described herein include airborne shooter detection systems for an aircraft. The systems may include at least five sensors disposed on the body of an aircraft and a processor in communication with the sensors configured for determining the location of the source of the projectile. The at least five sensors may be configured for receiving signals indicative of one or more characteristics of a shockwave of a projectile. At least two of the five sensors may be separated by a distance of at least 10 m.

In yet another aspect, the systems and methods described herein include methods for locating a source of a projectile fired at an aircraft. The methods may include receiving, at a plurality of sensors mounted on an aircraft, signals indicative of one or more characteristics of a shockwave of a projectile fired at the aircraft, analyzing the signals to unambiguously determine a location of a source of the projectile and outputting the location of the source.

In certain embodiments, analyzing the signals may include measuring at least an initial portion of the signals. Analyzing the signals further may include determining from the measured initial portion of the signals Time Differences Of Arrival (TDOA). In certain embodiments, analyzing the signals includes determining, from the arrival times of the shockwave at the sensors, at least one of the arrival angle, the radius of curvature and the spatial gradient of the radius of curvature of the shockwave. The spatial gradient of the radius of curvature may be used to unambiguously determine the location of the source of the projectile.

In certain embodiments, the methods include receiving data from an aircraft avionics system. The data from the aircraft avionics system may include at least one of temperature, attitude, altitude and ground speed. In certain embodiments, the shockwave corresponds to potentially ambiguous locations for the source of the projectile, and the plurality of sensors may be mounted on the aircraft such that for each of a plurality of aircraft orientations, at least 5 sensors can receive the shockwave. In some embodiments, the shockwave corresponds to potentially ambiguous locations for the source of the projectile, and the plurality of sensors may be spaced apart on the surface of the body of the aircraft such that for each of a plurality of aircraft orientations, at least 5 sensors can receive the shockwave.

BRIEF DESCRIPTION OF THE DRAWINGS

The following figures depict certain illustrative embodiments of the invention in which like reference numerals refer to like elements. These depicted embodiments may not be drawn to scale and are to be understood as illustrative of the invention and as not limiting in any way.

DETAILED DESCRIPTION OF THE
ILLUSTRATED EMBODIMENTS

To provide an overall understanding of the invention, certain illustrative embodiments will now be described, including display apparatus and constituent components thereof. However, it will be understood by one of ordinary skill in the art that the apparatus described herein may be adapted and modified as is appropriate for the application being addressed and that the systems and methods described herein may be employed in other suitable applications, and that such other additions and modifications will not depart from the scope hereof.

As will be seen from the following description, in one aspect, the systems and methods described herein relate to a detection system having a plurality of sensors coupled to the body of an aircraft such as a helicopter. The sensors are configured and arranged to unambiguously identify the location of a shooter.

Figure 1:
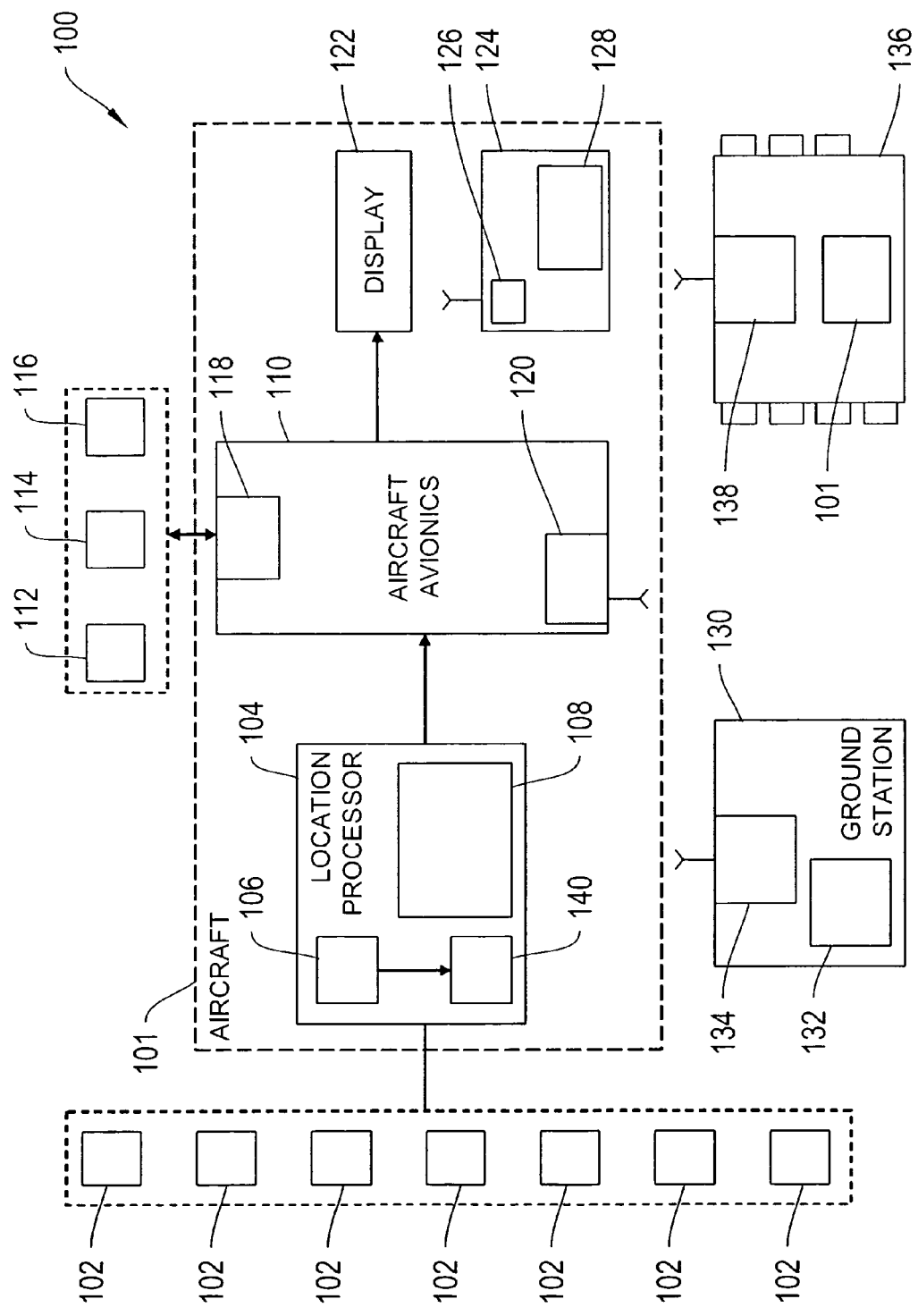
FIG. 1 is a block diagram depicting a detection system on an aircraft for detecting a shooter location, according to an illustrative embodiment of the invention.

More particularly, FIG. 1 is a block diagram depicting a detection system 100 for detecting a shooter location, according to an illustrative embodiment of the invention. The detection system 100 includes a plurality of acoustic sensors 102 disposed on the body of an aircraft 101. The sensors 102 are connected to a location processor 104 and aircraft avionics 110 that may be located inside the body of the aircraft 101. The location processor 104 includes various functional applications and/or hardware subcomponents for managing the sensors 102 and processing data from the sensors 102. Some functional applications include a sensor calibration and control application 106 for operating the sensors 102 and receiving data from them, and a shooter location application 108 for calculating the location of a shooter. The location processor 104 further includes a data transport/conversion/aggregation component 140 for aggregating the sensor data, converting the data to a suitable format and transmitting the data to the shooter location application 108. The aircraft avionics 110 includes a plurality of electronic circuitry and processors for managing, controlling and operating various features of the aircraft. The aircraft avionics 110 includes, among other things, communication circuitry 120 to communicate with a ground station 130 or with other aircraft 136. The avionics 110 also includes an environmental sensor control unit 118 for operating and collecting data from one or more environmental sensors 112, 114 and 116. In certain embodiments, sensors 112, 114, 116 may be interfaced directly with the location processor 104. The environmental sensors, including temperature sensors 112, aircraft attitude, vector velocity sensors 114 and other sensors 116 such as Mean Sea Level (MSL) and/or Above Ground Level (AGL) altimeters, Global Positioning System (GPS) units and ground velocity sensors are disposed on the external surface of the aircraft fuselage and/or internally.

The avionics 110 is connected to the aircraft's heads-up display 122 for displaying, among other things, relevant shooter location information to the pilot. The avionics 110 may also be remotely connected to the pilot's helmet electronics 124, including a helmet display 128, through the helmet communication circuitry 126. The avionics 110 also communicates with one or more ground stations 130. In certain embodiments, the avionics 110 communicates information about shot detection or shooter location to the pilot via audio/intercom announcements. The avionics 110 may also assist the location processor 104 in determining a shooter location by providing relevant data collected from sensors 112, 114 and 116 and other information obtained from the ground station 130, the ground station detection system 132, another aircraft 136 or from the pilot.

When a projectile such as a bullet, traveling at supersonic speed, approaches the detection system 100, the projectile generates an acoustic shockwave. The shockwave surface is typically an expanding conical surface having its axis coincident with the bullet trajectory. The shockwave surface is also referred to as the Mach cone. To resolve the location of the shooter, the arrival angle, the radius of curvature, and the spatial gradient of the radius of curvature of the expanding conical surface are determined from arrival times measured at five or more sensors 102.

In one embodiment, during operation, the sensors 102, whose airframe coordinates (positions on the fuselage) are accurately known, receive one or more acoustic signals representative of the shockwave generated by a bullet or other projectile. At least five, and preferably seven sensors receive the shockwave signal at different times and generate electrical signals in response to the shockwave pressure. The shooter location application 108 in the processor 104 determines a Time-Difference-Of-Arrival (TDOA) from the initial portion of the shockwave-only signals. The shooter location application 108 determines the TDOA by designating a sensor that first encounters the shockwave as a reference sensor, and determining the time of arrival of the shockwave at the other sensors in relation to the reference sensor. The shooter location application 108 determines the direction (azimuth and elevation angle) of the origin of the bullet from, among other things, the TDOA information and airframe coordinates of the sensors 102. A more detailed description of the TDOA process for determining shooter location is provided in commonly assigned U.S. Pat. No. 7,126,877, incorporated herein by reference in its entirety. The shooter location application 108 may be created and implemented in the processor 104 using hardware circuitry or using software languages including, but not limited to, C, C++, JAVA.

In certain situations, solving for the arrival angle, relative to the airframe, of the conical surface that first reaches the sensors 102 may result in two possible solutions (often called 'ambiguous' angles). The 'ambiguous' angles will be described in more detail below with reference to FIG. 2. The radius of curvature of the conical surface at the sensors 102 may determine both distance and direction to the trajectory. The ambiguity between the two possible solutions can be removed by determining and evaluating the gradient of the radius of curvature of the cone.

Determining these shockwave properties (the arrival angle, the radius of curvature, and the spatial gradient of the radius of curvature of the expanding conical surface) accurately, and deciding between the two possible 'ambiguous' trajectory angles requires very precise measurements. For example, random errors should be no greater than the ones depicted on FIG. 4 to decide correctly between the two alternative shooter aspect angles. The required accuracy can be estimated by considering the propagation characteristic of the shockwave. In certain embodiments, the arrival time of the shockwave is measured to within 0.1 percent of the difference in travel times between the farthest sensors. Moreover, shockwaves reaching the fuselage of the aircraft, in general, pass through intense turbulence that has the effect of smearing in time the leading edge by up to approximately 30 microseconds. The detection system 100 preferably includes a sufficient number of sensors strategically placed on the surface of the airframe such that most, if not all, shockwaves resulting in potentially ambiguous location solutions are detected by preferably seven (7), and at least five (5), sensors 102. Five (5) sensors at a minimum are used for resolving, unambiguously, the location of a shooter. Using information from a sixth sensor provides a more accurate estimate of the location of the shooter. To help ensure data is obtained from 5 or 6 sensors, redundancy is provided by providing a seventh sensor.

Figure 2:
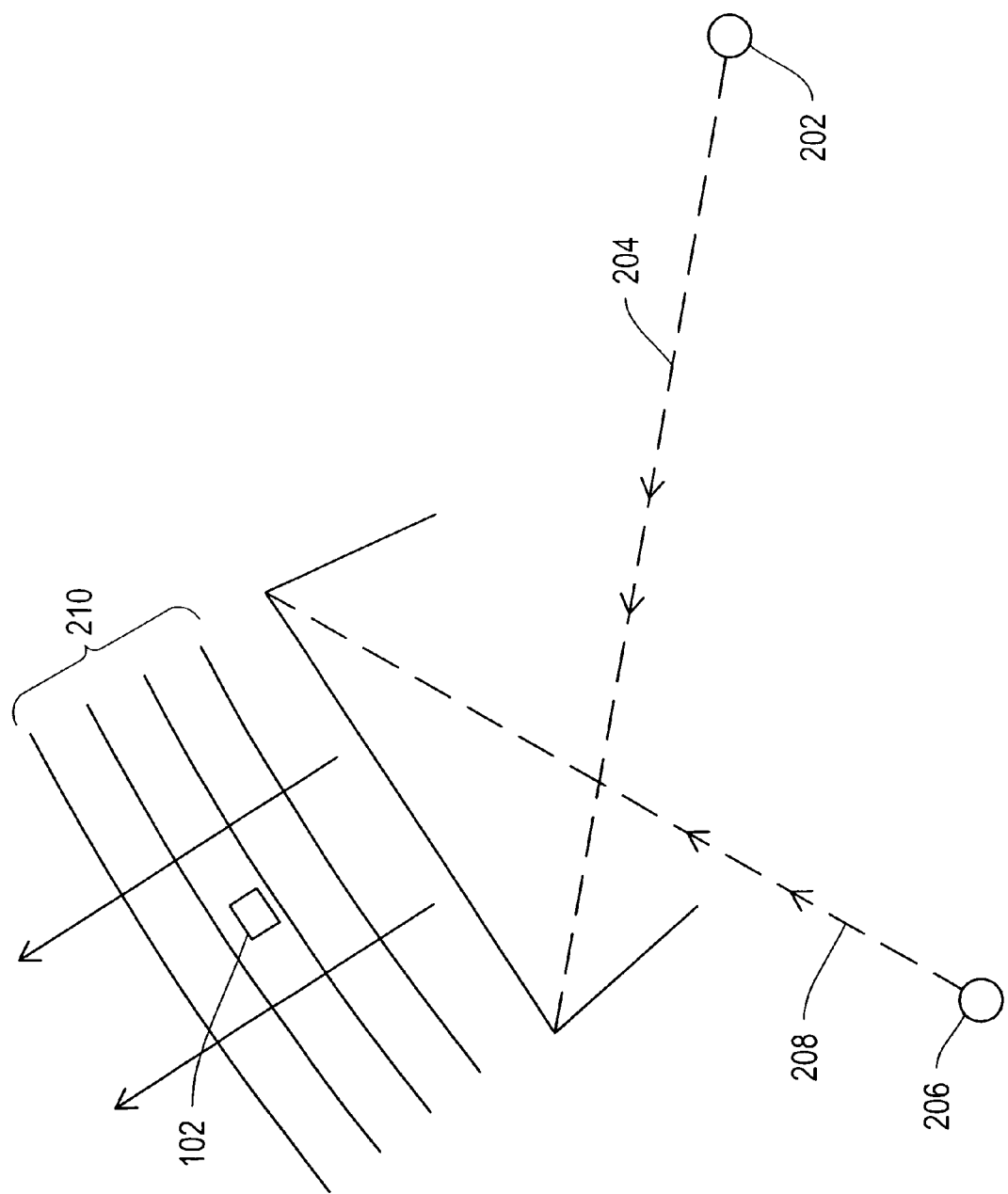
FIG. 2 depicts schematically the ambiguity inherent in detection systems utilizing only shockwave information from an incoming projectile.

FIG. 2 depicts schematically the ambiguity inherent in detection systems utilizing only shockwave information from an incoming projectile. For a given shooter position 202 and bullet trajectory 204, there is another shooter position 206 and bullet trajectory 208 for which the TOA of the shockwave at a given set of sensors is nearly identical. The two ambiguous solutions are substantially identical if in a simplified model, the shockwave 210 is assumed to propagate across the sensor 102 as a plane wave. If the TDOA resolution is high enough to resolve the curvature of the shockwave, then the two nearly identical solutions can be disambiguated. Assuming sufficiently accurate TDOA measurements, the location processor 104 may obtain the gradient of the curvature and thereby obtain the true solution for shooter position and bullet trajectory by computing the shooter/trajectory combination that minimizes the root-mean-square (RMS) residual of measured and computed shockwave TDOA.

Figure 3:
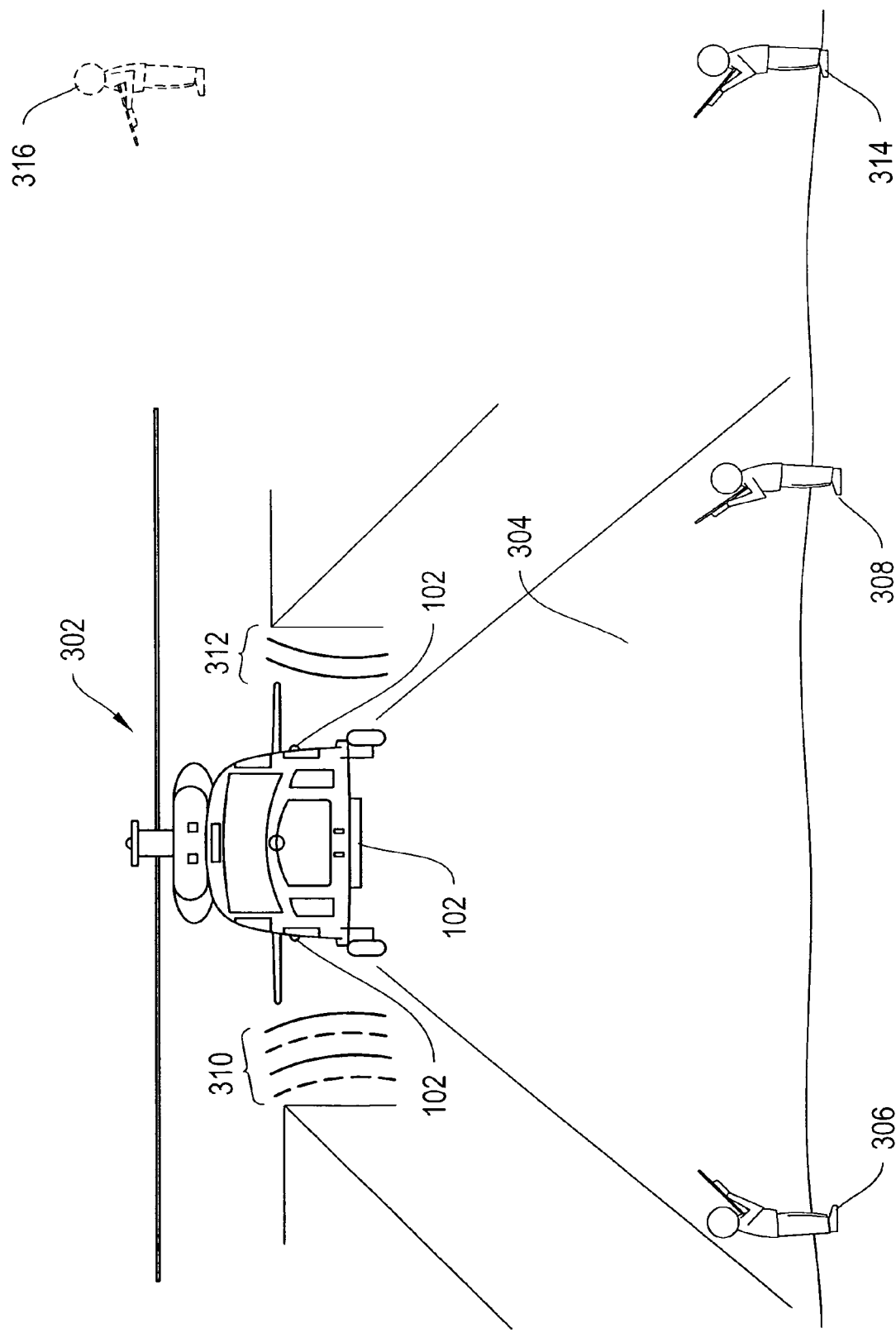
FIG. 3 depicts the zone below an aircraft where there is a possibility of ambiguity in detecting a shooter location.

An aircraft may have a plurality of sensors strategically positioned around its fuselage. Ambiguity in determining shooter location may exist all around the aircraft because as noted earlier, for every shooter location, there exists another shooter location (mirror image) that may be able to account for the shockwave received at the sensors. Depending on the trajectory of the projectile with respect to the aircraft as well as the aircraft's orientation with respect to ground level, the mirror image may be non-terrestrial. For the purposes of detecting ground based shooters, the solutions corresponding to non-terrestrial shooter locations are disregarded leaving only one solution. However, as shown in FIG. 3, when the a shooter is positioned underneath the aircraft and missing projectiles pass below the aircraft 302 fuselage (missing low), the mirror images may be terrestrial. That is, there are two possible terrestrial shooter locations. In particular, FIG. 3 depicts the zone 304 below an aircraft 302 where there is a possibility of ambiguity in detecting a shooter location. For simplifying this discussion, assume that the aircraft 302 is level with ground. Under this simplifying assumption, shooter 306 is located in a zone 304 underneath the aircraft fuselage. Consequently, when missing projectiles fly below the aircraft, their corresponding shockwaves strike the bottom of the aircraft's fuselage, but not the side of the fuselage.

Generally, when a shooter 314 is located outside zone 304, portions of the shockwave generated by missing projectiles, passing above (missing high) or below (missing low) the aircraft, strike the sensors 102 located on the right or left of the aircraft, and potentially sensors on the bottom, as well. In such a situation, the mirror image 316 of the shockwave striking the side sensors 102 is non-terrestrial. Therefore, as described above, the system 100 may be able to unambiguously and easily identify the location of the shooter 314 as being the shockwave originating from the projectile fired from the terrestrial location. When a shooter 306 is located within zone 304 and the projectile fired by the shooter 306 misses high, portions of the shockwave strike the sensors 102 located on the right or left of the aircraft. Therefore, similarly, depending on which sensors receive these shockwaves, the system 100 may be able to unambiguously and easily identify the location of the shooter.

However, when a shooter 306 is located within zone 304 and the projectile fired by the shooter 306 misses low, the shockwave-only detection system may require additional data to identify the location of shooter 306 and distinguish it from its ambiguous mirror image location 308. In certain embodiments, the system 100 includes at least five (5), six (6), seven (7), or any number of sensors that can receive acoustic shockwaves coming from projectiles missing low fired by shooters located within zone 304. These sensors may be positioned on the bottom of the fuselage of the aircraft 302. The system 100 may unambiguously identify the location of the shooter by resolving the curvature of the shockwave.

Aircraft, however frequently alter their orientation during flight, e.g., banking while turning. For example, during flight, an aircraft may be required to tilt from one side to another, or raise or lower its nose. During such maneuvers, the left, right, front or back of the aircraft may be exposed to the ambiguity zone 304. Consequently, the system 100 may be configured such that at least five (5), six (6) or seven (7) sensors can receive acoustic shockwaves regardless of the orientation of the aircraft. In certain scenarios, zone 304 may be located above, below or on any side of the aircraft depending on the location of the ambiguous shooter (e.g., flying through a canyon). Generally, when the missing projectiles fly above the aircraft 302 (miss high), the location of shooter 306 can be disambiguated and resolved because location solutions derived from the shockwaves 310 and 312 will result in only one possible terrestrial shooter location. In certain embodiments, the system 100 includes as many sensors as necessary such that at least five (5), six (6), seven (7), or any number of sensors are available to receive shockwaves from any angle and/or when the aircraft is tilted in any direction. In certain embodiments, as will be discussed later, physical constraints may limit the placement of sensors. In such embodiments, the system 100 includes as many sensors as possible within these constraints.

Traditional techniques of disambiguating shooter locations using muzzle blast signals are inapplicable in an aircraft such as a helicopter because the frequency range of muzzle blast signals overlaps the frequency range of acoustic noise on a helicopter. Therefore, the acoustic noise on the body of the helicopter tends to drown out signals from muzzle blasts. For shockwave caused by projectiles having two potential trajectories originating from the ground, system 100, instead estimates the gradient of the radius of curvature of the shockwave along the path of the surface which in turn determines which direction the bullet is moving, thereby removing the 'ambiguity' between the two possible directions. However, to estimate the gradient of curvature with a sufficiently high probability, at least two sensors 102 are separated by a distance sufficient to resolve the curvature of the shockwave.

Figure 4:
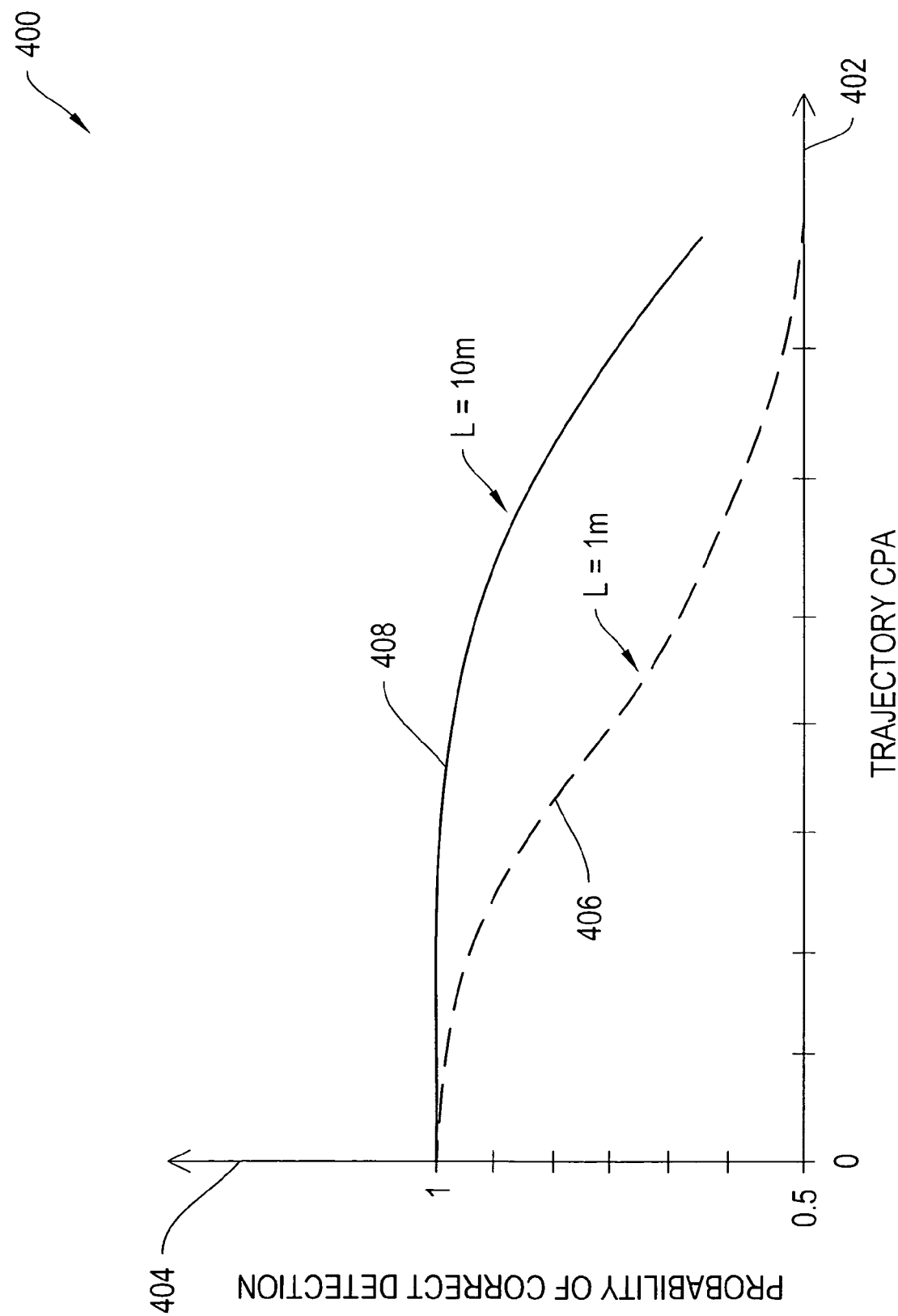
FIG. 4 depicts the probability of correctly disambiguating between shooter trajectories.

Not to be bound by theory, but the further apart the sensors 102 are, the higher the probability of correctly disambiguating the location of a shooter based on the shockwave from a missing projectile. FIG. 4 depicts the probability of correctly disambiguating between shooter trajectories. Referring now to FIG. 4, the probability of a correct decision, or confidence level for disambiguation, is plotted for two exemplary sensor 102 spacings, L=1 m and L=10 m, against the closest point of approach (CPA) between the projectile's trajectory and one or more sensors 102. In particular, the horizontal axis 402 is the closest distance between a projectile's trajectory and the system 100, CPA. The vertical axis 404 shows the probability of a correct decision. The curve 406 shows the probability of a correct detection values for a range of CPAs when the sensors 102 are placed about 1 m from each other. The curve 408 shows the probability of a correct detection values for a range of CPAs when the sensors 102 are placed about 10 m from each other. It is evident that a larger sensor spacing has significantly expanded range for unambiguous shockwave-only solutions. For large CPA values, the difference in curvature at the two sensors 102 is greater when the sensor spacings are greater than or equal to about 10 m. Consequently, the probability of a correct detection or disambiguation at these large CPA values is higher when the sensor spacing is greater than or equal to about 10 m. As noted earlier, such a sensor arrangement is advantageous because, among other things, high CPA values are common when portable weapons such as sniper rifles are fired at aircraft through intensely turbulent rotor or wing downwash. In certain embodiments, the sensor spacing depends on, among other things, a desired confidence level for disambiguation. In such embodiments, for a given CPA value, the sensor spacing may be less than or greater than 10 m to achieve a desired level of confidence. The largest sensor spacing (largest of the distances between at least two sensors in the system 100) may be from about 8 m to about 11 m. In such embodiments, the remaining sensors of the system 100 may be spaced apart by any distance. In certain embodiments, the spacing between at least two sensors may be greater than 11 m.

Figure 5A:
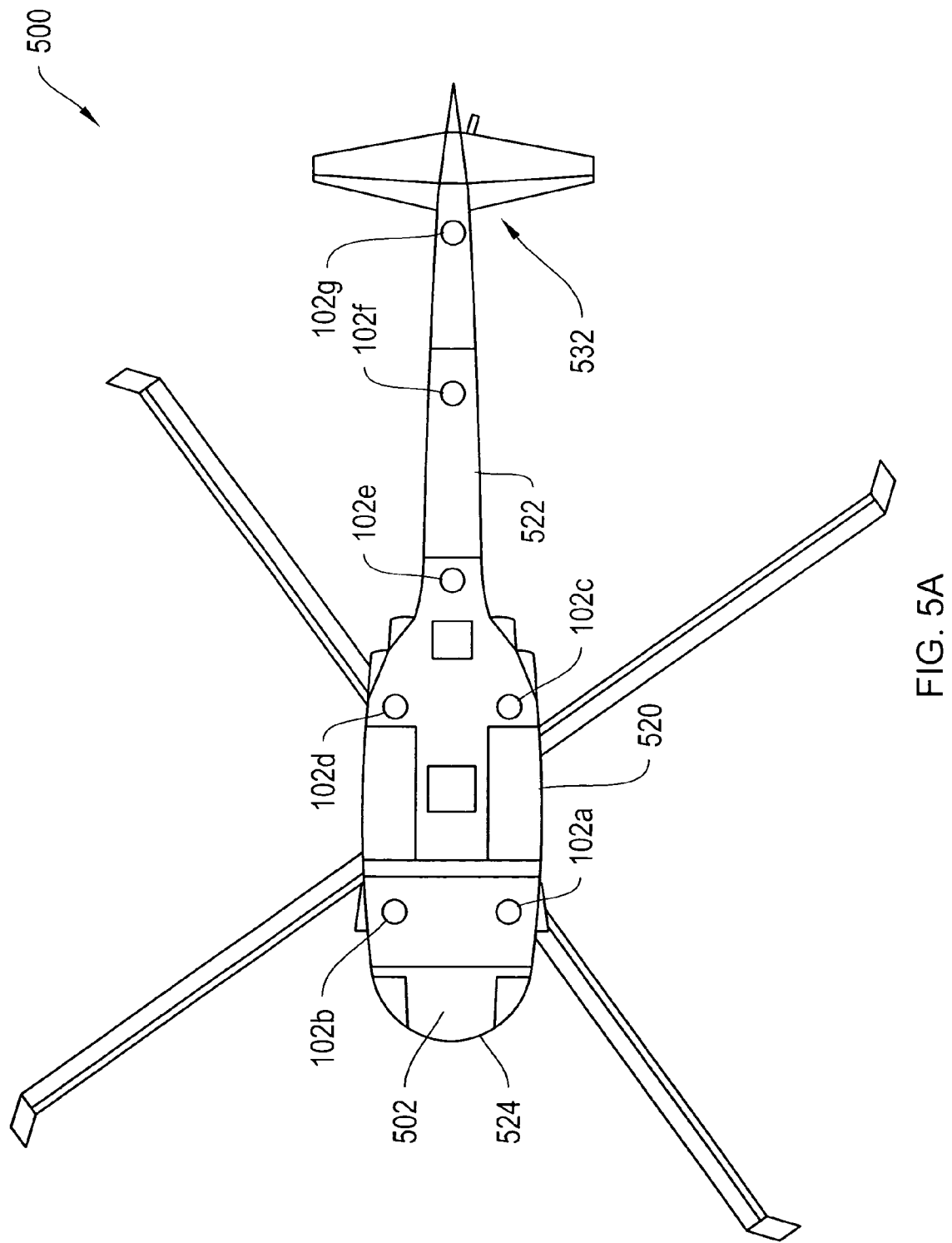
FIGS. 5A and 5B depict bottom and side views, respectively, of a helicopter having a plurality of sensors disposed on the fuselage, according to an illustrative embodiment of the invention.
Figure 5B:
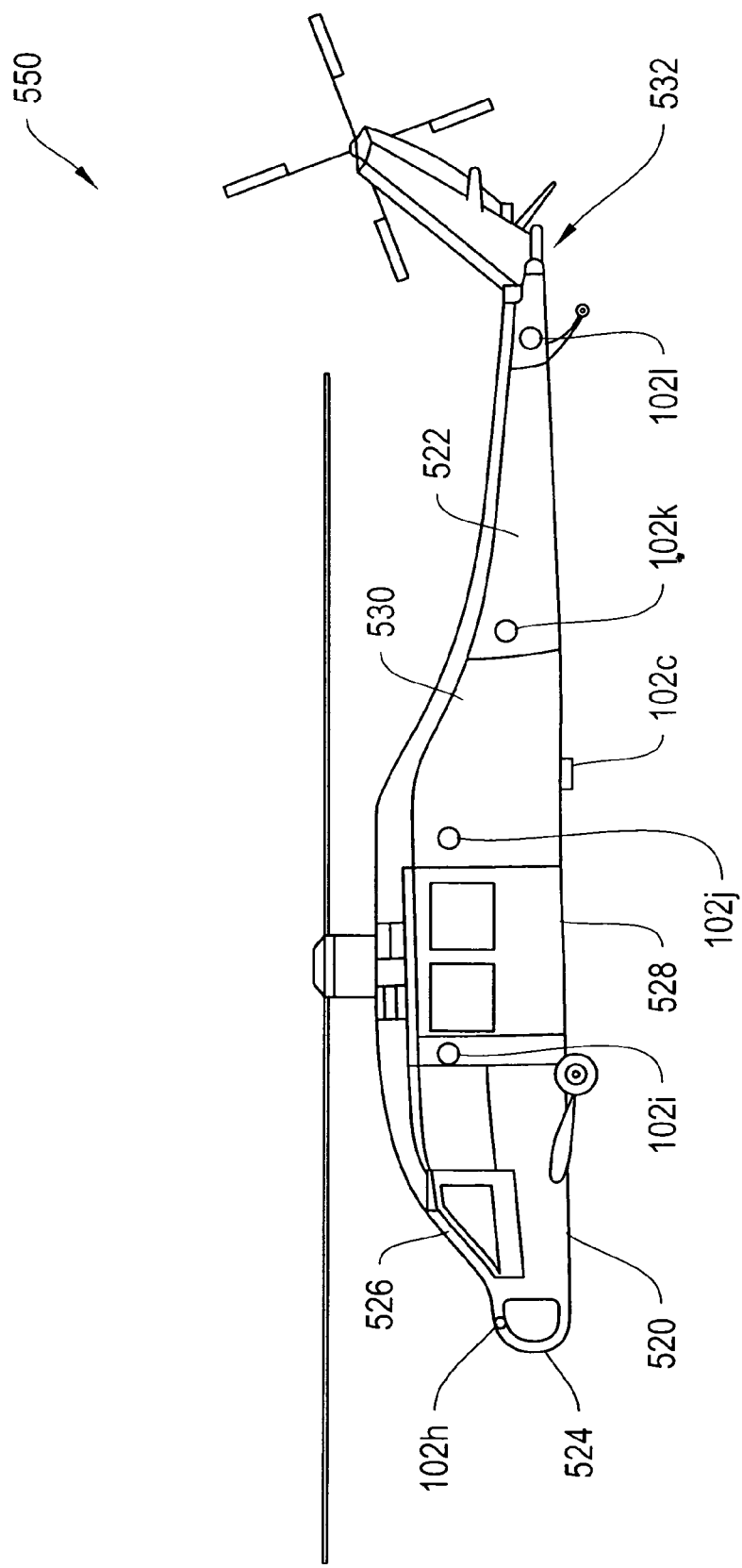

In addition to being influenced by certain mathematical constraints as described above, sensor placement may also be constrained by the physical structure of the aircraft 101. Theoretically, it would be preferable to place sensors 102 substantially equally apart on the body of the aircraft, thereby providing a uniformly distributed system 100. However, such an arrangement may be difficult to achieve because of the physical constraints imposed on aircrafts. Conversely, the mathematical constraints imposed on the system 100, such as a preferred sensor spacing may be advantageously accommodated on an aircraft because of its physical size. FIGS. 5A and 5B depict bottom 500 and side views 550, respectively, of a helicopter 520 having a plurality of sensors 102 disposed on its fuselage, according to an illustrative embodiment of the invention. For purposes of clarity, and not by way of limitation, one exemplary placement of sensors 102 in system 100 may be described herein in the context of placing the sensors 102 on a helicopter. However, it will be appreciated that the principles described herein may be adapted to other aircraft. For example, the principles of this disclosure may be applied to airplanes where the sensors are positioned based on the constraints imposed by the physical structure of the airplane. More generally, the systems described herein may be employed as suitable, and accounting for the constraints present in any aircraft where it is desirable to provide detection system 100.

The bottom portion 500 of the fuselage of the helicopter 520 includes seven (7) sensors 102a-102g positioned from the nose region 524 to the tail region 532. As shown, the region underneath the cockpit 526 includes two (2) sensors 102a and 102b. The regions underneath the cabin 528 and the engine/transmission/fuel tank 530 includes two (2) sensors 102c and 102d. The bottom of tail boom portion 522 includes three (3) sensors 102e, 102f and 102g. In such an arrangement, at least two sensors may be at least 10 m apart. For example, the sensor 102a or 102b under the nose region 524 may be separated from sensor 102g under the tail boom 522 by a distance of greater than about 10 m. One or more physical constraints found on the bottom 500 of the helicopter 520 may influence the placement of the sensors 102a-102g. In certain embodiments, the bottom 500 includes landing gear such as skids or wheel-bays. The sensors 102a-102g may be suitably placed around these physical constraints. In certain embodiments, the sensors 102a-102g may be placed on the skids. In certain embodiments, the sensors 102a-102g may be placed at any location on the bottom 500 as desired. Additional sensors may placed at various locations along the bottom 500.

The top and side portions 550 of the fuselage of the helicopter 520 include a plurality of sensors 102h-102l positioned from the nose region 524 to the tail region 532. Sensor 102h is placed on the nose 524 of the helicopter 520. Sensor 102i is placed between the cockpit 526 and cabin 528 of the helicopter 520. Sensor 102j is placed on the engine/transmission/fuel tank 530 and sensors 102k and 102l are disposed on the tail boom 522. In certain embodiments, sensor 102h may be placed anywhere on the nose 524 including the front portion. In such an arrangement, at least two sensors may be at least 10 m apart. For example, the sensor 102*h* on the nose region 524 may be separated from sensor 102*l* on the tail boom 522 by a distance of greater than about 10 m. One or more physical constraints found on the front and sides 550 of the helicopter 520 may influence the placement of the sensors 102*h*-102*l*. As an example, the sides of the helicopter 520 may include a plurality of doors, windows and service bays. The sensors 102*h*-102*l* may be suitably placed around these physical constraints.

Sensors similar to sensors 102*h*-102*l* may be placed on the side opposite to side 550 of the helicopter 520. In one embodiment, the helicopter 520 include a total of seventeen (17) sensors including four (4) on each of the right and left side, two (2) in the front on the nose 524 and seven (7) on the bottom 500.

In certain embodiments, the sensors 102 include acoustic sensors, such as microphones. In certain embodiments, the sensors 102 include digital microphones that have delta modulated signal outputs, or analog outputs. In such embodiments, the sensors 102 may include flush-mounted microphones having a diameter of about 1 cm. In such embodiments the sensors 102 may include fairing-mounted microphones where the fairings may include windscreens and cavities to offset the microphones from air flow.

Figure 6A:
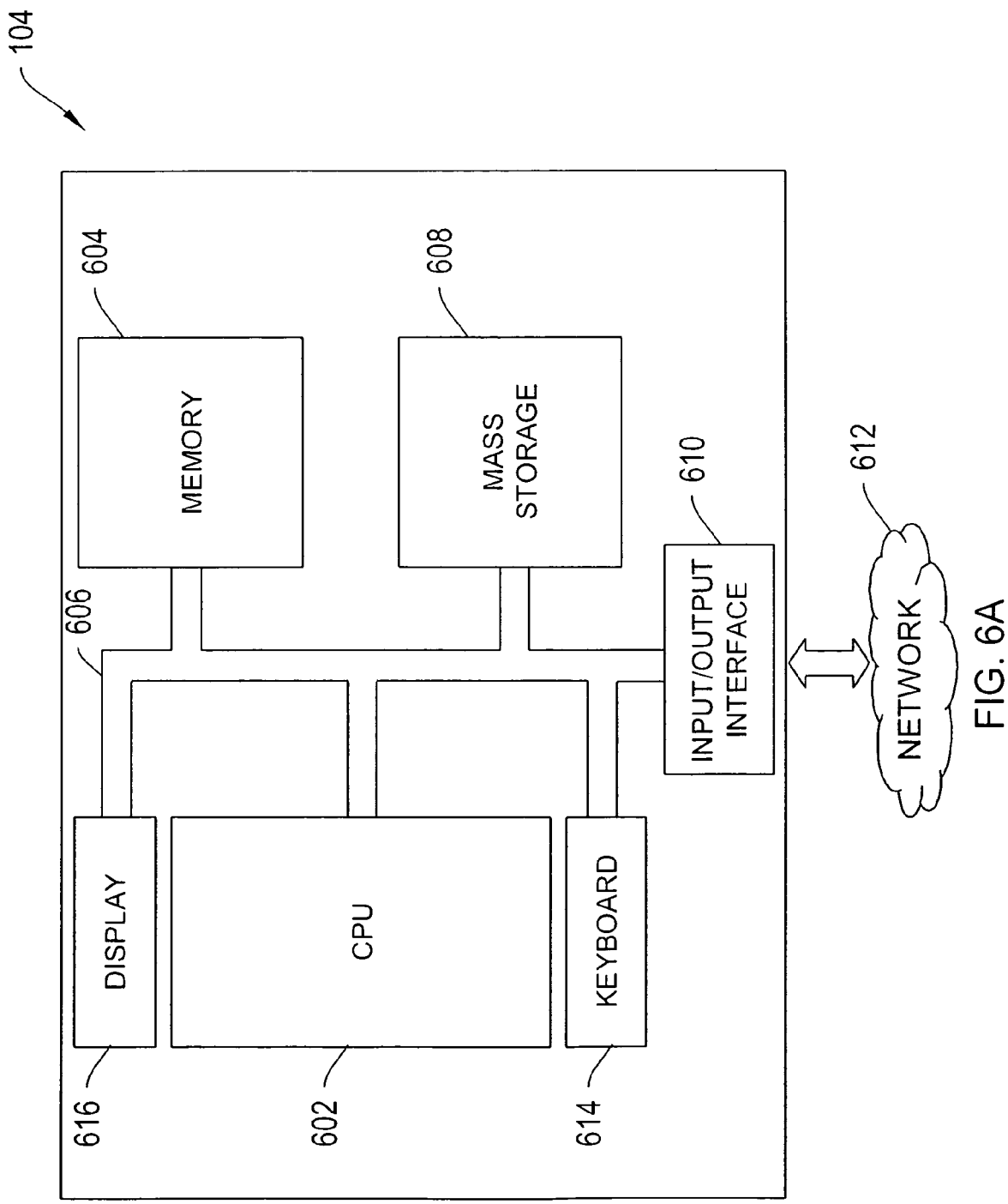
FIG. 6A is a block diagram depicting the physical components of a computer system, according to an illustrative embodiment of the invention.

FIG. 6A is a general block diagram depicting the physical components of a location processor 104, according to an illustrative embodiment of the invention. The exemplary location processor 104 includes a central processing unit (CPU) 602, a memory 604, and an interconnect bus 606. The CPU 602 may include a single microprocessor or a plurality of microprocessors for configuring location processor 104 as a multi-processor system. The memory 604 illustratively includes a main memory and a read only memory. The computer 110 also includes the mass storage device 608 having, for example, various disk drives, tape drives, FLASH drives, etc. The main memory 604 also includes dynamic random access memory (DRAM) and high-speed cache memory. In operation, the main memory 604 stores at least portions of instructions and data for execution by the CPU 602.

The mass storage 608 may include one or more magnetic disk or tape drives or optical disk drives, for storing data and instructions for use by the CPU 602. At least one component of the mass storage system 608, preferably in the form of a disk drive or tape drive, stores the database used for processing the signals measured by the sensors 102. The mass storage system 608 may also include one or more drives for various portable media, such as a floppy disk, a compact disc read only memory (CD-ROM), DVD, or an integrated circuit non-volatile memory adapter (i.e. PC-MCIA adapter) to input and output data and code to and from the location processor 104.

The location processor 104 may also include one or more input/output interfaces for communications, shown by way of example, as interface 610 for data communications via the network 612. The data interface 610 may be a modem, a network card, serial port, bus adapter, or any other suitable data communications mechanism for communicating with one or more systems on-board the aircraft or on the ground. To provide the functions of a computer 104 according to FIG. 1, the data interface 610 may provide a relatively high-speed link to a network 612, such as on-board avionics intranet, or ground based networks such as the Internet. The communication link to the network 612 may be, for example, optical, wired, or wireless (e.g., via satellite or cellular network). Alternatively, the location processor 104 may include a mainframe or other type of host computer system capable of communications via the network 612.

The location processor 104 also includes suitable input/output ports or use the interconnect bus 606 for interconnection with avionics 110, a local display 616 and keyboard 614 or the like serving as a local user interface for programming and/or data retrieval purposes. Alternatively, personnel may interact with the processor 104 for controlling and/or programming the system from remote terminal devices via the network 612.

The location processor 104 may run a variety of application programs and stores associated data in a database on mass storage system 608. One or more such applications may enable the receipt and delivery of messages to enable operation as a server, for implementing server functions relating to measuring acoustic signals and locating the position of a shooter by system 100 of FIG. 1.

In certain embodiments, the CPU 602 includes circuitry for an analog-to-digital converter and/or a digital-to-analog converter. In such embodiments, the analog-to-digital converter circuitry converts analog signals received at the sensors to digital signals for further processing by the location processor 104.

The components contained in the location processor 104 are those typically found in aircraft computer systems, flight-deck avionics, combat avionics, general purpose computer systems used as servers, workstations, personal computers, network terminals, and the like. In fact, these components are intended to represent a broad category of such computer components that are well known in the art. Certain aspects of the invention may relate to the software elements, such as the executable code and database for the server functions of the detection system 100.

Generally, the methods described herein may be executed on a conventional data processing platform such as an IBM PC-compatible computer running the Windows operating systems, a SUN workstation running a UNIX operating system or another equivalent personal computer or workstation. Alternatively, the data processing system may comprise a dedicated processing system that includes an embedded programmable data processing unit.

The process described herein may also be realized as a software component operating on a conventional data processing system such as a UNIX workstation. In such an embodiment, the process may be implemented as a computer program written in any of several languages well-known to those of ordinary skill in the art, such as (but not limited to) C, C++, FORTRAN, Java or BASIC. The process may also be executed on commonly available clusters of processors, such as Western Scientific Linux clusters, which are able to allow parallel execution of all or some of the steps in the present process.

The method of the present invention may be performed in either hardware, software, or any combination thereof, as those terms are currently known in the art. In particular, the present method may be carried out by software, firmware, or microcode operating on a computer or computers of any type, including preexisting or already-installed avionics processing facilities capable of supporting any or all of the location processor's functions. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

Figure 6B:
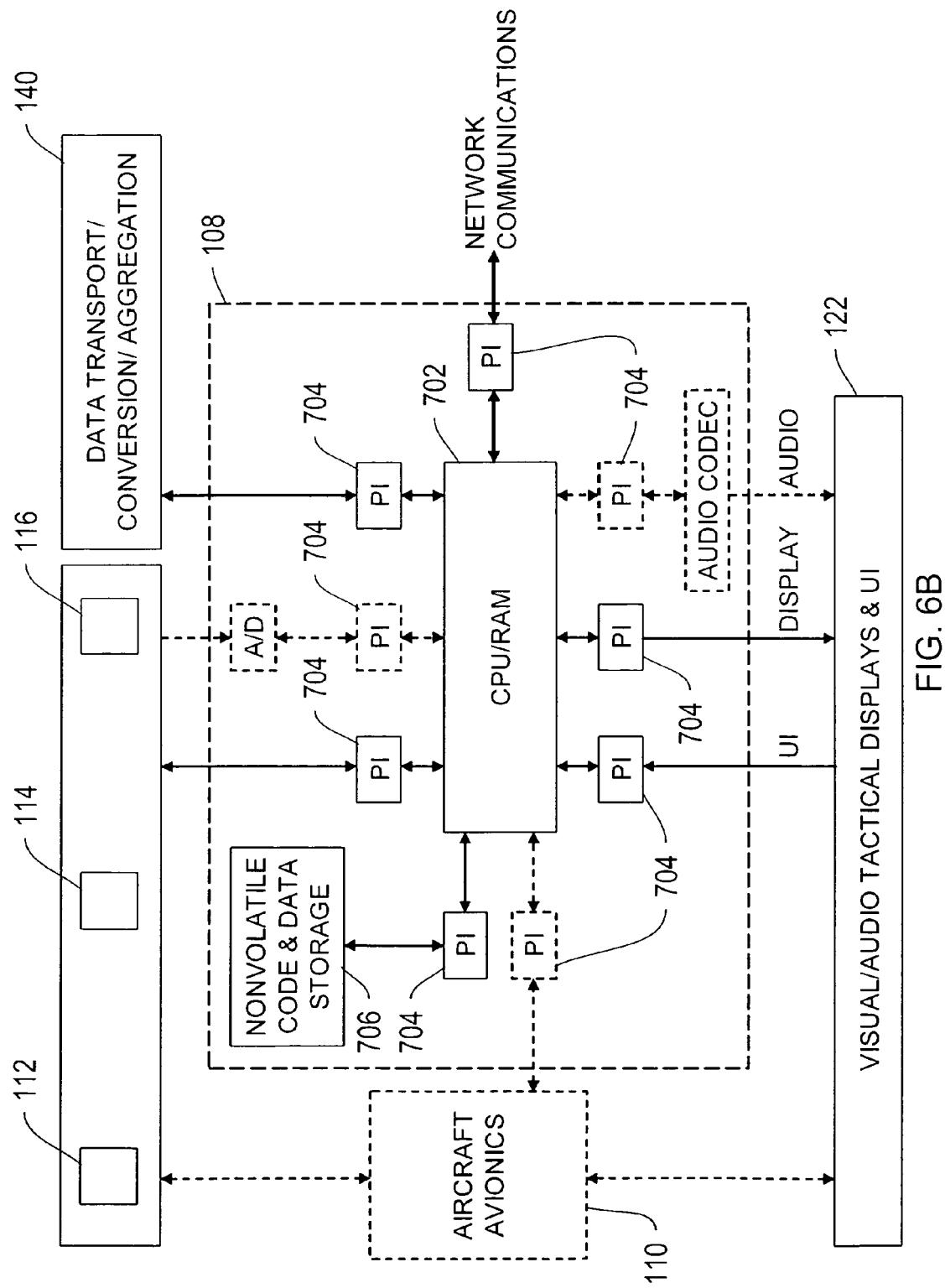
FIG. 6B is a more detailed block diagram depicting the physical components of the computer system of FIG. 6A, according to an illustrative embodiment of the invention.

FIG. 6B is a more detailed block diagram depicting the physical components of the computer system of FIG. 6A, according to an illustrative embodiment of the invention. In particular, the location processor 104 includes a CPU/RAM unit 702 and a plurality of integrated and/or attached peripheral interfaces ("PI") 704. The PI 704 may serve as a communication link between at least two of data transport unit 140, sensors 112, 114 and 116, data storage 706, displays 122 including helmet display, audio units and network communications. The PI 704 may comprise a suitable interface including at least one of a RS232, RS432, RS422 and RS485 serial ports. The PI 704 may also include at least one of universal serial bus (USB), parallel port, I-squared C bus, I-squared S bus, ARINC 429 bus, MIL-STD-1553 bus, Ethernet, LVDS. The PI 704 may also be fully custom designed for a particular application.

The invention may be embodied in other specific forms without departing from the spirit or essential characteristics thereof. The forgoing embodiments are therefore to be considered in all respects illustrative, rather than limiting of the invention.

The invention claimed is:

1. An airborne shooter detection system for a helicopter, comprising:
 a plurality of sensors spaced apart on the surface of the body, including at least on the bottom and sides of the helicopter, wherein the plurality of sensors are configured for receiving signals indicative of one or more characteristics of a shockwave of a projectile, and the plurality of sensors are distributed from about the nose of the helicopter to about the tail of the body of the helicopter such that for each of a plurality of different helicopter orientations, at least five of the plurality of sensors can receive the shockwave;
 a processor in communication with a plurality of sensors configured for unambiguously determining the location of the source of the projectile; and
 an output device in communication with the processor for outputting the determined location.

2. The system of claim 1, wherein the plurality of sensors includes about seven sensors distributed from about the nose of the helicopter to about the tail of the body of the helicopter such that for each of a plurality of different helicopter orientations, the plurality of sensors can receive the shockwave.

3. The system of claim 1, wherein the plurality of sensors includes from about 15 to about 18 sensors, distributed from about the nose of the helicopter to about the tail of the body of the helicopter such that for each of a plurality of different helicopter orientations, the plurality of sensors can receive the shockwave.

4. The system of claim 1, wherein at least two sensors of the plurality of sensors are separated by a distance sufficient to unambiguously determine the location of the source of the projectile with a probability of greater than about 0.8.

5. The system of claim 1, wherein at least two sensors of the plurality of sensors are separated by a distance from about 8 m to about 11 m.

6. The system of claim 5, wherein at least two sensors of the plurality of sensors are separated by a distance of about 10 m.

7. The system of claim 1, further comprising an avionics system in communication with the processor.

8. The system of claim 7, further comprising at least one of a temperature sensor and pressure sensor coupled to the avionics system.

9. The system of claim 8, wherein the processor is configured to receive data from the at least one temperature sensor and pressure sensor via the avionics system for unambiguously determining the location of the source of the projectile.

10. The system of claim 1, wherein the processor includes a shooter location application for determining the location of the source of the projectile.

11. The system of claim 1, wherein the output device includes at least one of a display, heads-up display (HUD), helmet display, intercom, radio and headset.

12. An airborne shooter detection system for a helicopter, comprising:
 a plurality of sensors disposed on the body of the helicopter configured for receiving signals indicative of one or more characteristics of a shockwave of a projectile, wherein the plurality of the sensors are distributed substantially from about the nose of the helicopter to about the tail of the helicopter such that for each of a plurality of different helicopter orientations, at least five of the plurality of sensors can receive the shockwave; and
 a processor in communication with the sensors configured for determining the location of the source of the projectile.

13. The system of claim 12, wherein at least two sensors of the plurality of sensors are separated by a distance of at least 8 m.

14. A method for locating a source of a projectile fired at a helicopter, comprising:
 receiving, at a plurality of sensors mounted on a helicopter, signals indicative of one or more characteristics of a shockwave of a projectile fired at the helicopter, wherein the plurality of sensors are distributed from about the nose of the helicopter to about the tail of the helicopter such that for each of a plurality of different helicopter orientations, at least five of the plurality of sensors can receive the shockwave;
 analyzing the signals to unambiguously determine a location of a source of the projectile; and
 outputting the location of the source.

15. The method of claim 14, wherein analyzing the signals comprises measuring at least an initial portion of the signals.

16. The method of claim 14, wherein analyzing the signals further comprises determining from the measured initial portion of the signals Time Differences Of Arrival (TDOA), and determining the location of the source based at least part of the determined TDOAs.

17. The method of claim 14, wherein analyzing the signals comprises determining, from the arrival times of the shockwave at the sensors, at least one of the arrival angle, the radius of curvature and the spatial gradient of the radius of curvature of the shockwave.

18. The method of claim 17, wherein analyzing the signals comprises determining the spatial gradient of the radius of curvature of the shockwave, and using the determined spatial gradient to unambiguously determine the location of the source of the projectile.

19. The method of claim 14, further comprising receiving data from an avionics system mounted aboard the helicopter.

20. The method of claim 19, wherein the data from the avionics system includes at least one of temperature, attitude, altitude and ground speed.

* * * * *